US010894306B2

(12) United States Patent
Wang

(10) Patent No.: US 10,894,306 B2
(45) Date of Patent: Jan. 19, 2021

(54) DETACHMENT PULLER

(71) Applicant: BO CHEN HUNG CO., LTD., Taichung (TW)

(72) Inventor: Ming-Yu Wang, Taichung (TW)

(73) Assignee: BO CHEN HUNG CO., LTD., Taichung (TW)

( * ) Notice: Subject to any disclaimer, the term of this patent is extended or adjusted under 35 U.S.C. 154(b) by 155 days.

(21) Appl. No.: 16/172,058

(22) Filed: Oct. 26, 2018

(65) Prior Publication Data

US 2020/0130143 A1 Apr. 30, 2020

(51) Int. Cl.
*B25B 5/10* (2006.01)
*B23P 19/04* (2006.01)

(52) U.S. Cl.
CPC ................ *B25B 5/10* (2013.01); *B23P 19/04* (2013.01)

(58) Field of Classification Search
CPC ......... Y10T 29/53848; Y10T 29/53857; B27B 27/023; B27B 27/062; B25B 5/10; B23P 19/04
USPC ........................... 29/252, 255, 258, 259, 262
See application file for complete search history.

(56) References Cited

U.S. PATENT DOCUMENTS 7,496,999 B2 * 3/2009 Robarge .................. B25B 13/48 29/255
9,073,190 B2 * 7/2015 Sjosten ............... B25B 27/0064
9,216,499 B2 * 12/2015 Huang .................. B25B 27/023
2014/0223713 A1 * 8/2014 Chen ..................... B25B 27/062 29/256

FOREIGN PATENT DOCUMENTS

TW M518284 U 3/2016

* cited by examiner

*Primary Examiner* — Tyrone V Hall, Jr.
*Assistant Examiner* — Makena S Markman
(74) *Attorney, Agent, or Firm* — Muncy, Geissler, Olds & Lowe, PC

(57) ABSTRACT

A detachment puller is provided, including a main body, having a threaded hole and a plurality of pivoting portions circumferentially disposed around the threaded hole; a screw rod, screwed with the threaded hole; a plurality of jaws, respectively pivoted to the plurality of pivoting portions, each of the plurality of jaws including an abutted portion; an adjustment mechanism, elastically and movably disposed on the main body, the adjustment mechanism including a plurality of engaging portions, each of the plurality of engaging portions including a first abutting portion and a second abutting portion, the abutted portion being located between the first and second abutting portions, the first abutting portion being movable toward a first direction to press the abutted portion, the second abutting portion being movable toward a second direction to press the abutted portion, the first and second directions being opposite to each other.

9 Claims, 10 Drawing Sheets

20
1
40
10
41
A
12
A
30

DETACHMENT PULLER

BACKGROUND OF THE INVENTION

Field of the Invention

The present invention relates to a detachment puller.

Description of the Prior Art

As disclosed in TWM518284, the prior art includes a main body, an upper cover and a plurality of jaws, the main body has a plurality of engaging grooves which are open laterally; the upper cover is fixed on the main body, and the upper cover has a plurality of engaging portions; the plurality of jaws are respectively pivoted to each of the plurality of engaging grooves, and each of the plurality of jaws has a toothed face which corresponds to the engaging portion.

However, in the prior art, each said engaging portion abuts against the toothed face of each said jaw to fix a pivoting angle of each said jaw, a user has to swing the plurality of jaws to appropriate positions one by one through an exterior force (for example, hands), so it is inconvenient and complicated to operate.

The present invention has arisen to mitigate and/or obviate the afore-described disadvantages.

SUMMARY OF THE INVENTION

The major object of the present invention is to provide a detachment puller, which provides bi-directional forces for quick and stable operation.

To achieve the above and other objects, a detachment puller is provided, including a main body, having a threaded hole and a plurality of pivoting portions circumferentially disposed around the threaded hole; a screw rod, screwed with the threaded hole; a plurality of jaws, respectively pivoted to the plurality of pivoting portions, each of the plurality of jaws including an abutted portion; an adjustment mechanism, elastically and movably disposed on the main body, the adjustment mechanism including a plurality of engaging portions, each of the plurality of engaging portions including a first abutting portion and a second abutting portion, the abutted portion being located between the first and second abutting portions, the first abutting portion being movable toward a first direction to press the abutted portion, the second abutting portion being movable toward a second direction to press the abutted portion, the first and second directions being opposite to each other.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
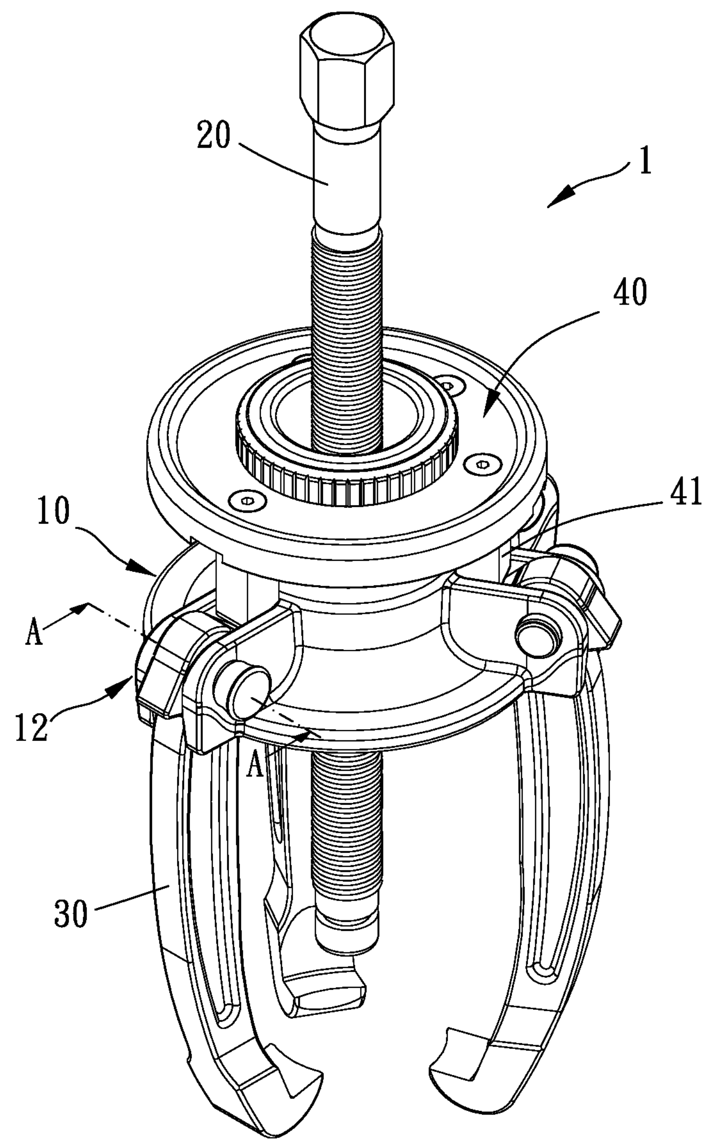
FIG. 1 is a stereogram of a preferred embodiment of the present invention.
Figure 2:
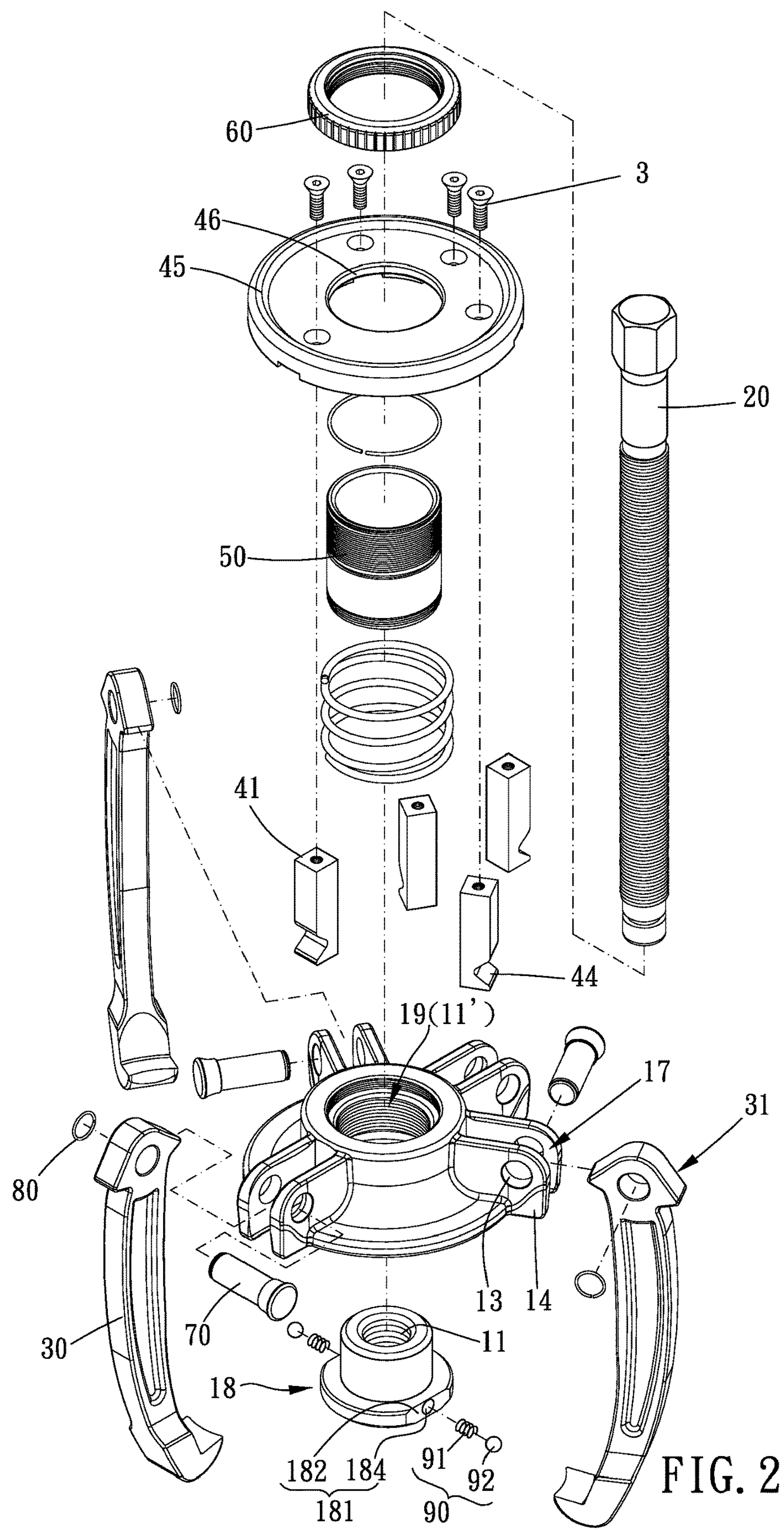
FIG. 2 is a breakdown view of the preferred embodiment of the present invention.
Figure 3:
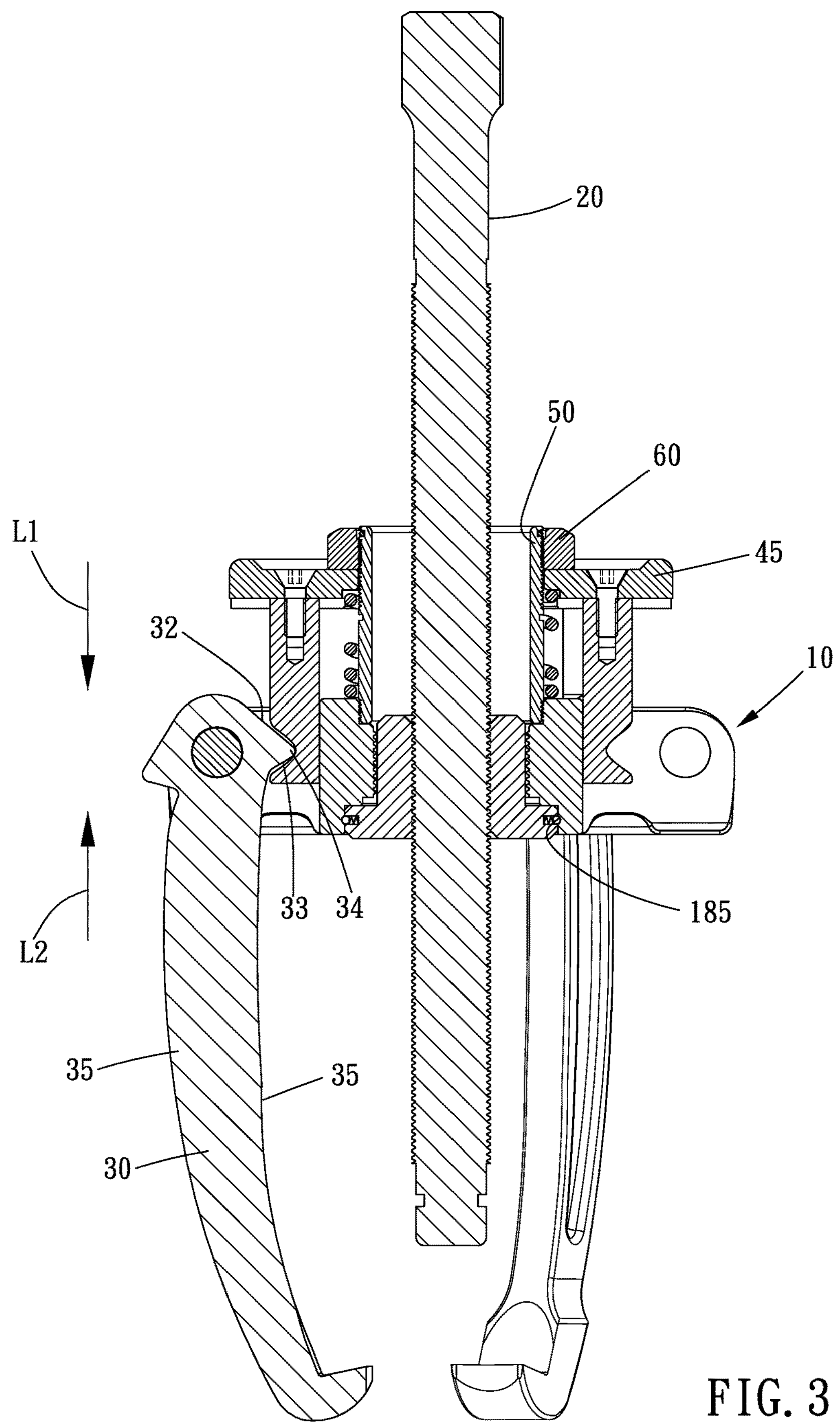
FIG. 3 is a cross-sectional view of the preferred embodiment of the present invention.
Figure 4:
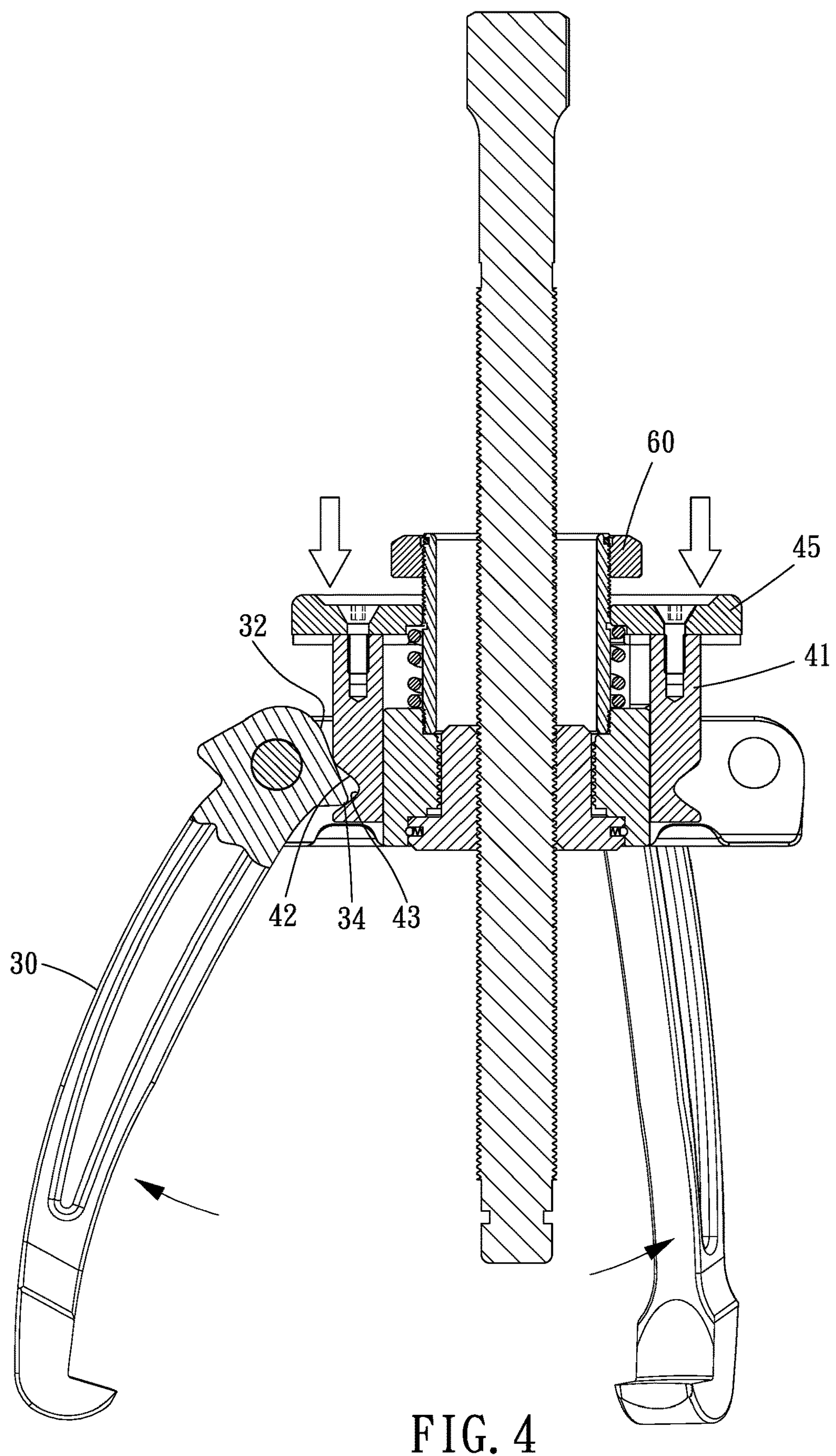
FIG. 4 is a drawing showing the preferred embodiment of the present invention in operation.
Figure 5:
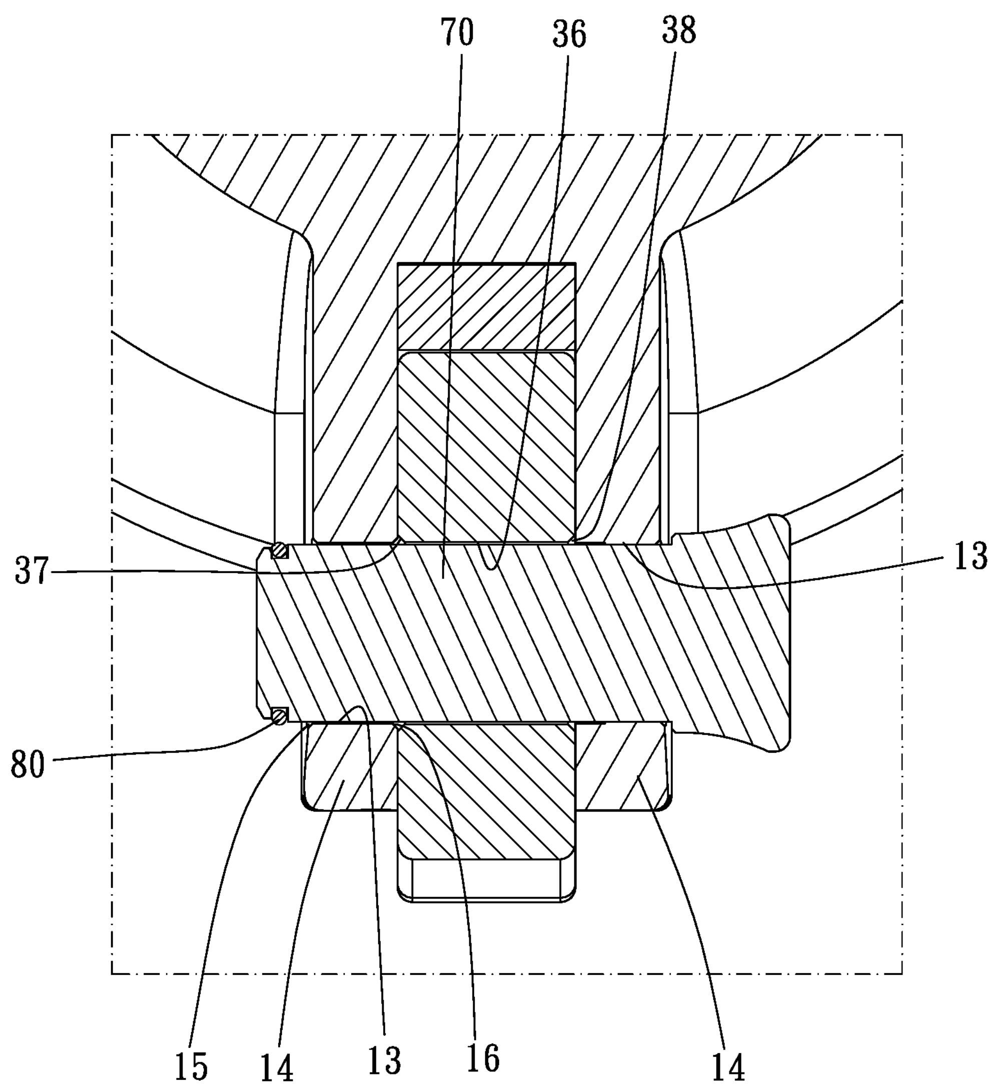
FIG. 5 is a partially cross-sectional enlarged view of the preferred embodiment of the present invention.
Figure 6:
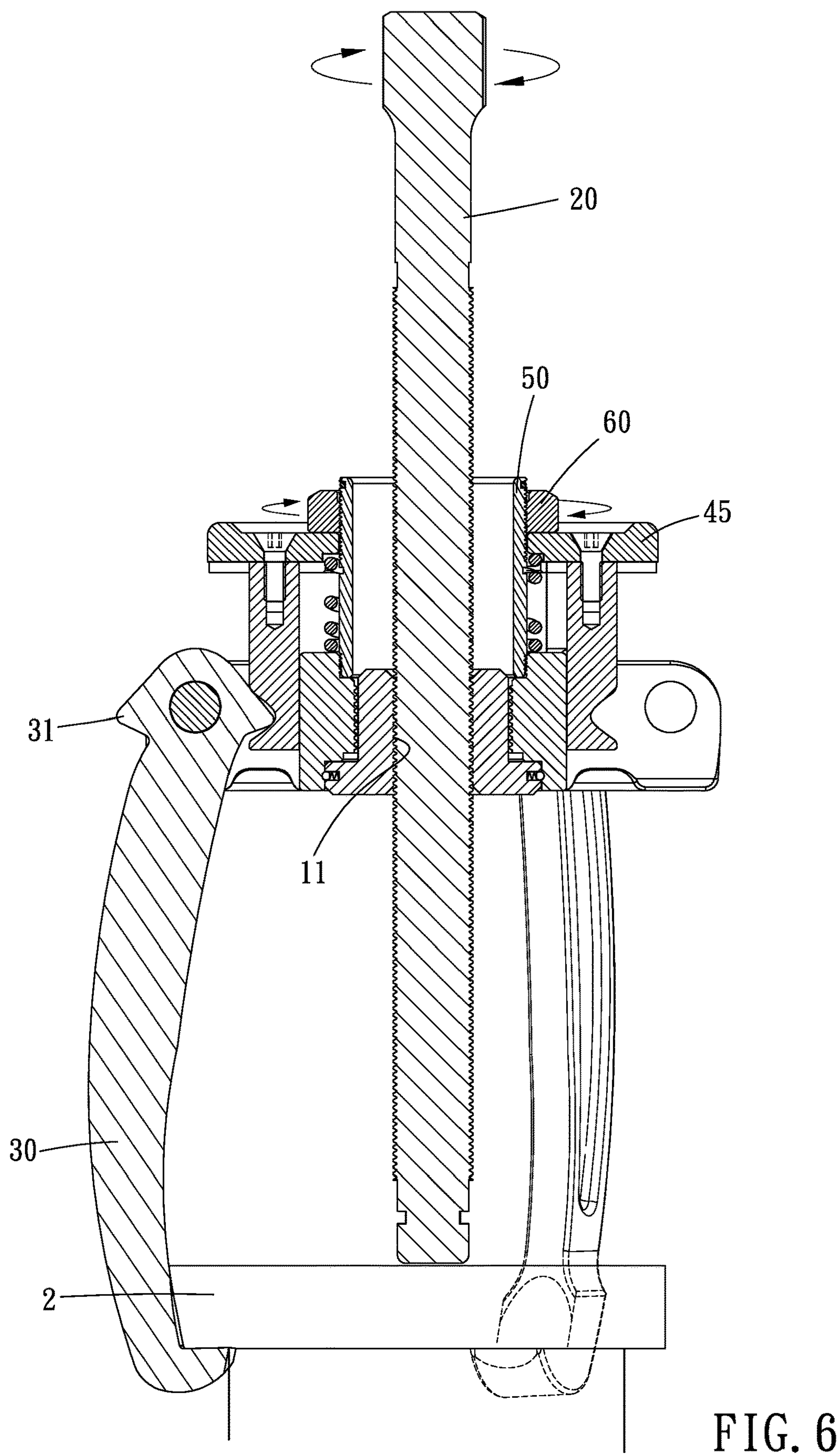
FIG. 6 is another drawing showing the preferred embodiment of the present invention in operation.

The present invention will be clearer from the following description when viewed together with the accompanying drawings, which show, for purpose of illustrations only, the preferred embodiment in accordance with the present invention.

Please refer to FIGS. 1 to 9 for a preferred embodiment of the present invention. A detachment puller 1 includes a main body 10, a screw rod 20, a plurality of jaw 30 and an adjustment mechanism 40.

The main body 10 has a threaded hole 11 and a plurality of pivoting portions 12 circumferentially disposed around the threaded hole 11; the screw rod 20 is screwed with the threaded hole 11; the plurality of jaws 30 are respectively pivoted to the plurality of pivoting portions 12, and each of the plurality of jaws 30 includes an abutted portion 31; the adjustment mechanism 40 is elastically and movably disposed on the main body 10, the adjustment mechanism 40 includes a plurality of engaging portions 41, each of the plurality of engaging portions 41 includes a first abutting portion 42 and a second abutting portion 43, the abutted portion 31 is located between the first and second abutting portions 42, 43, the first abutting portion 42 is movable toward a first direction L1 to press the abutted portion 31, the second abutting portion 43 is movable toward a second direction L2 to press the abutted portion 31, and the first and second directions L1, L2 are opposite to each other; thereby, forces are provided bi-directionally so that the jaws can open and close quickly and stably. The first abutting portion 42 and the second abutting portion 43 provides pressing forces in opposite directions to the abutted portion 31, specifically, after each of the plurality of jaws 30 is pressed and pivotally rotated by the first abutting portion 42, each of the plurality of jaws 30 is pressed by the second abutting portion 43 and return to an original position so that each of the plurality of jaws 30 can open and close stably and directly.

Each of the plurality of engaging portions 41 further includes an engaging groove 44 disposed between the first and second abutting portions 42, 43, and the abutted portion 31 is engaged within the engaging groove 44 so that each of the plurality of jaws 30 can swing stably. In this embodiment, the abutted portion 31 is cone-shaped, but in other embodiments, the abutted portion may be a multilateral body or a polygonal body. The abutted portion 31 further includes a first abutted slant face 32 and a second abutted slant face 33, the first and second abutted slant faces 32, 33 are located on two opposite sides of the abutted portion 31 and laterally disposed thereon, the first abutting portion 42 is abuttable against the first abutted slant face 32, and the second abutting portion 43 is abuttable against the second abutted slant face 44 to receive a force stably. Specifically, the first abutting portion 42 can move along the first abutted slant face 32 to swing each of the plurality of jaws 30, and the second abutting portion 43 does the same. In this embodiment, the first and second abutted slant faces 32, 33 are smooth surfaces which is preferable for the first and second abutting portions 42, 43 to abut thereagainst, and in other embodiments, the first and second abutted slant faces may be toothed surfaces. The engaging groove 44 is a chamfered groove; specifically, the abutted portion 31 further includes a convex face 34 which is located between the first and second abutted slant faces 32, 33, when each of the plurality of jaws 30 is on a first position, only the convex face 34 abuts against the engaging groove 44, and when each of the plurality of jaws 30 is on a second position, one of the first and second abutting portions 42, 43 and the convex face 34 abut against the engaging groove 44, and each of the plurality of jaws 30 swings between the first and second positions so that the abutted portion 31 can receive the force and pivotally rotate, and the abutted portion 31 can rotate to a preset angle to be stably positioned. Preferably, each of the plurality of engaging portions 41 protrudes toward the first direction L1, each of the plurality of pivoting portions 12 has a recess 17, the plurality of jaws 30 are pivoted to the recess 17, each of the plurality of engaging portions 41 is inserted into the recess 17, and a side of each of the plurality of engaging portions 41 abuts against a bottom of the recess 17. In this embodiment, each of the plurality of engaging portions 41 is a cuboid so as to move toward the first and second directions L1, L2 stably and not deviate easily.

Figure 7:
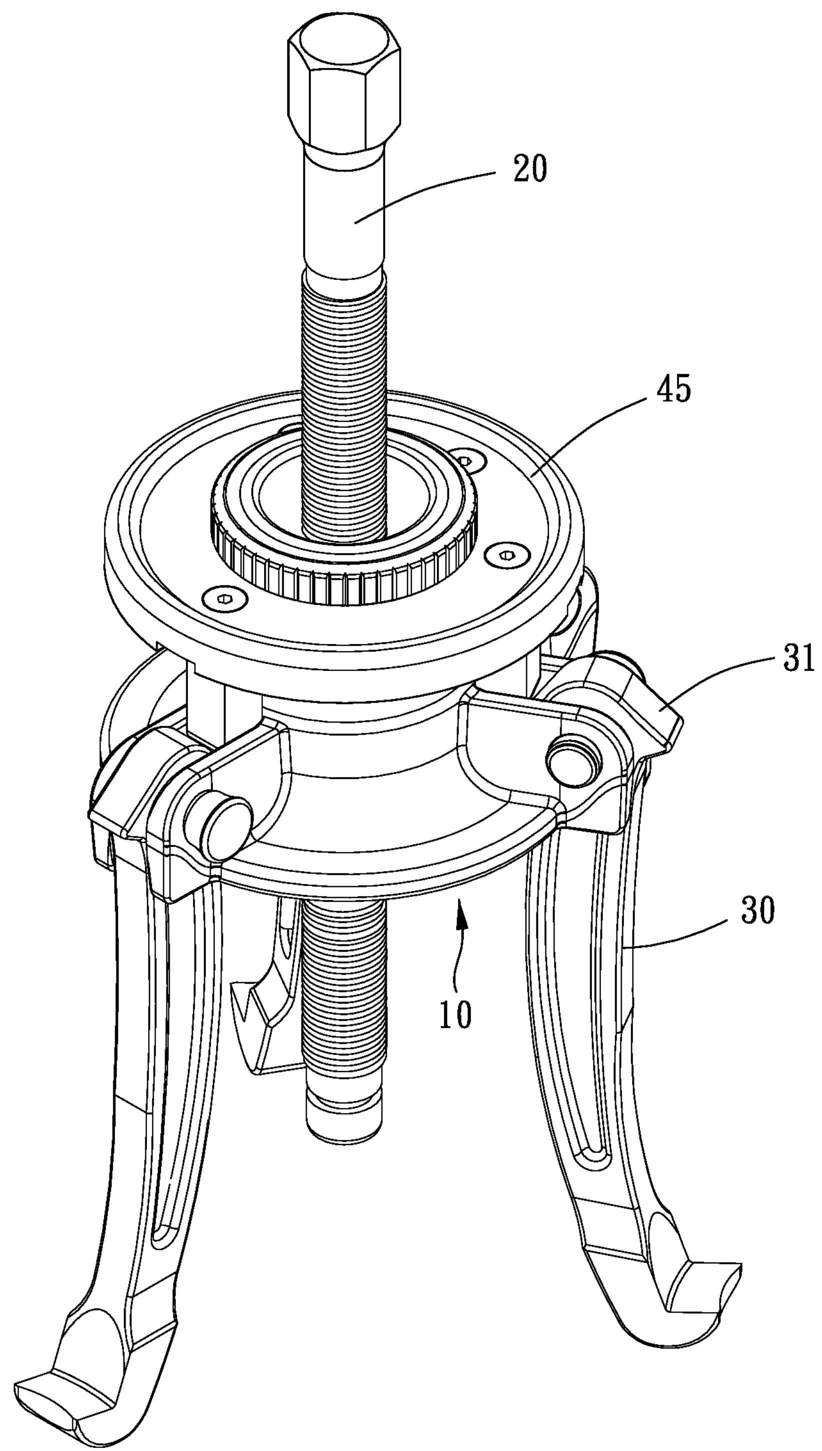
FIG. 7 is another stereogram of the preferred embodiment of the present invention.
Figure 8:
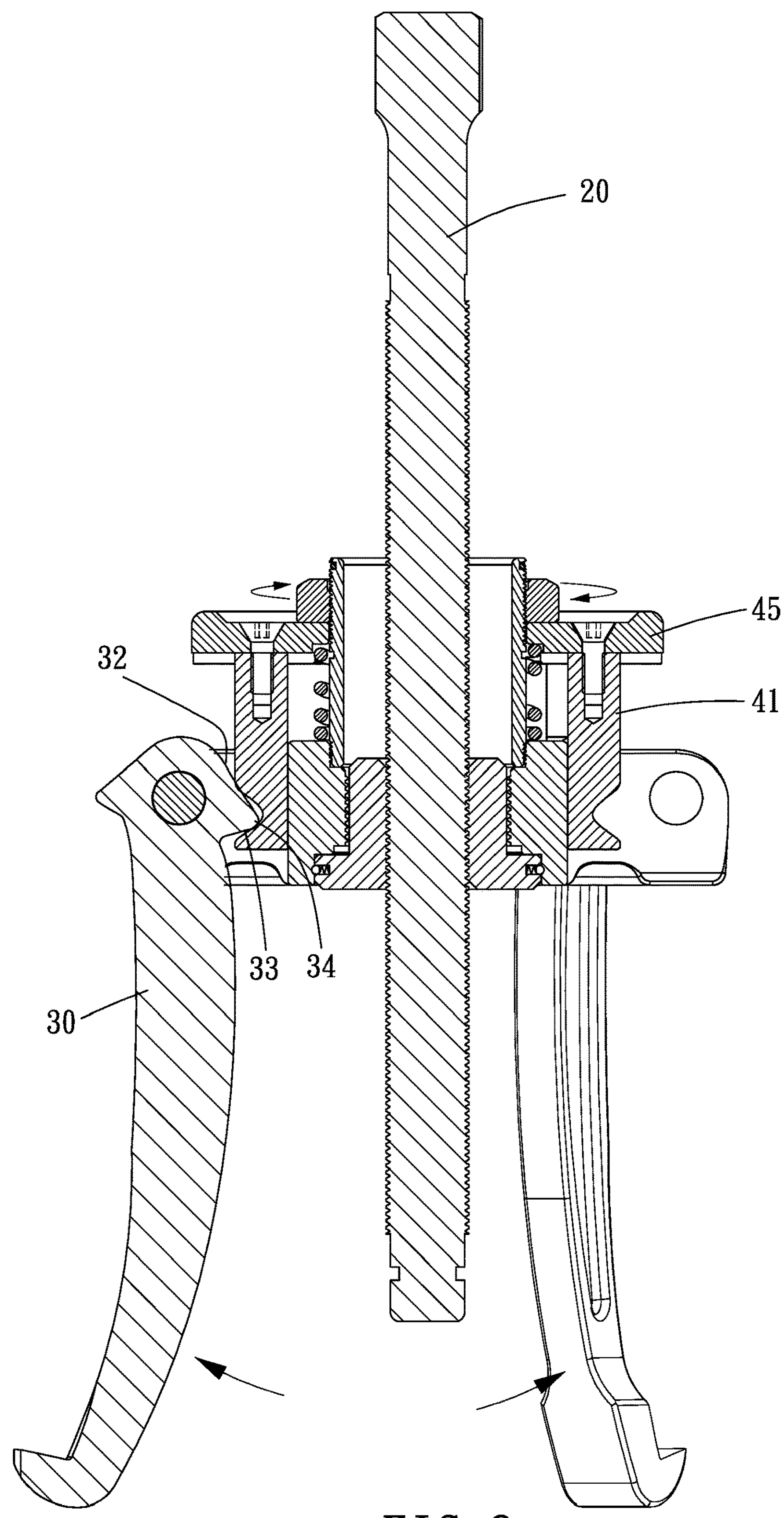
FIG. 8 is a drawing showing an operation state of a preferred embodiment of the present invention.
Figure 9:
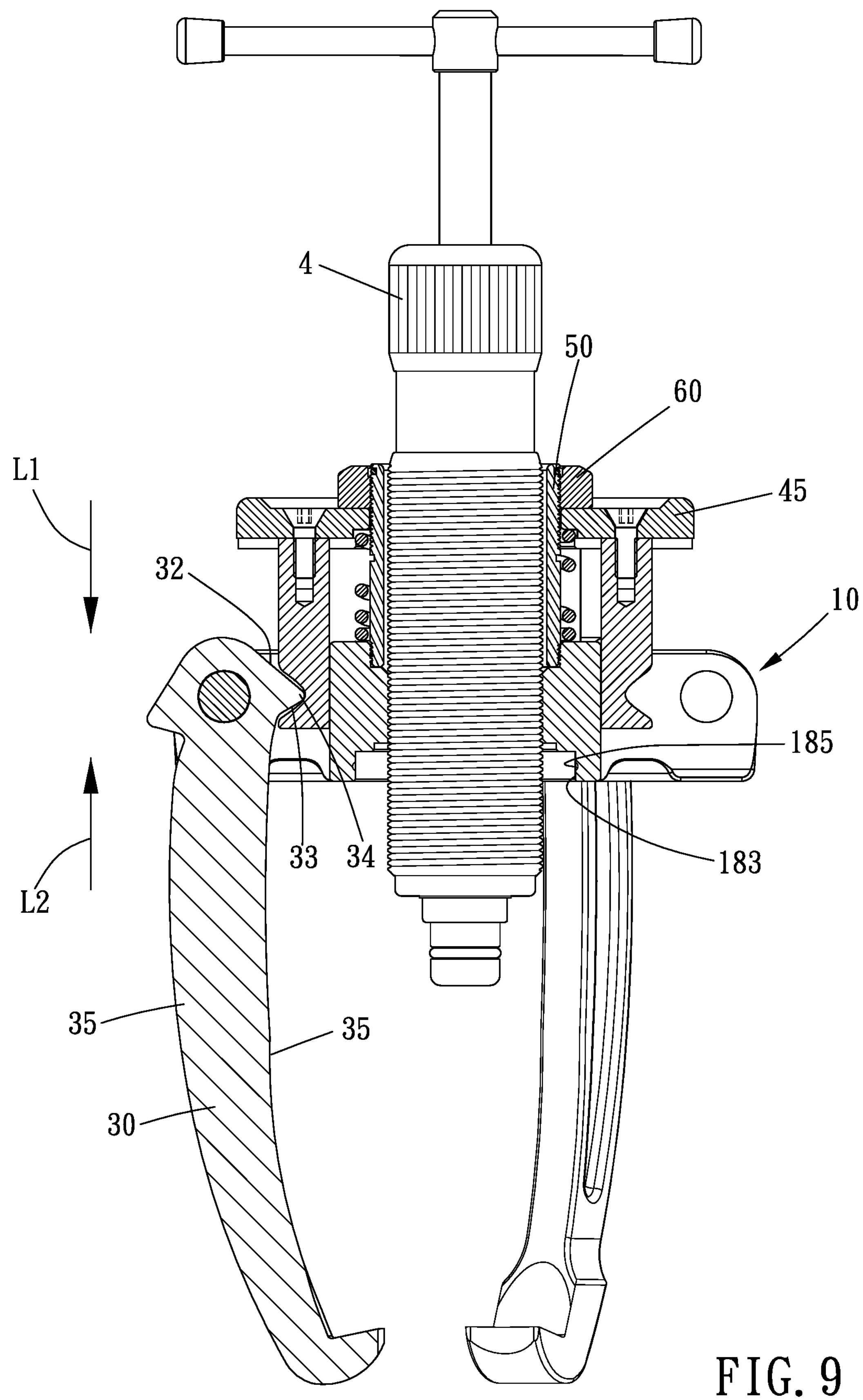
FIG. 9 is a drawing showing an operation state of another preferred embodiment of the present invention.

Preferably, each of the plurality of jaws 30 further includes a second abutted portion 31 disposed opposite to the abutted portion 31 so that each of the plurality of jaws 30 can be used with positive claws (as shown in FIG. 1) or negative claws (as shown in FIG. 7). Each of the plurality of abutted portions 31 protrudes radially beyond a side wall 35 of each of the plurality of jaws 30 to receive the force stably.

In addition, the adjustment mechanism 40 further includes a base 45, the plurality of engaging portions 41 are disposed on the base 45, and each of the plurality of engaging portions 41 protrudes laterally outward from the base 45. Preferably, each of the plurality of engaging portions 41 is detachably disposed on the base 45. In this embodiment, each of the plurality of engaging portions 41 is detachably screwed to the base 45, specifically, each of the plurality of engaging portions 41 is screwed to the base 45 with a screw member 3 for being assembled and disassembled easily. In addition, the detachment puller 1 further has an elastic member which abuts against and between the base 45 and the main body 10 to provide repositioning function.

The detachment puller 1 further includes a tube 50 and a positioning ring 60, the tube 50 is connected to the main body 10, the tube 50 and the threaded hole 46 are coaxially arranged, the base 45 is sleeved to the tube 50 via a through hole 46 of the base 45, the positioning ring 60 is movably and positionably sleeved to the tube 50, the base 45 is located between the main body 10 and the positioning ring 60, and the positioning ring 60 is abuttable against the base 45 to fix a position of the base 45. Specifically, the adjustment mechanism 40 moves relative to the main body 10 toward the first direction L1 or the second direction L2 to open or close the plurality of jaws 30 to an appropriate position, and then the positioning ring 60 is moved along the tube 50 to press and restrict a position of the adjustment mechanism 40. In this embodiment, the positioning ring 60 is screwable relative to the tube 50.

Figure 10:
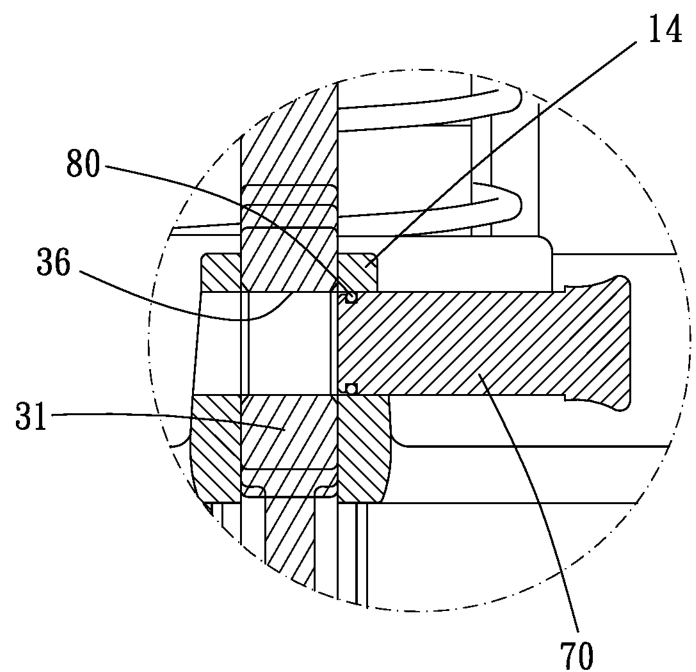
FIG. 10 is a drawing showing an operation state of a pin of the preferred embodiment of the present invention.
Figure 11:
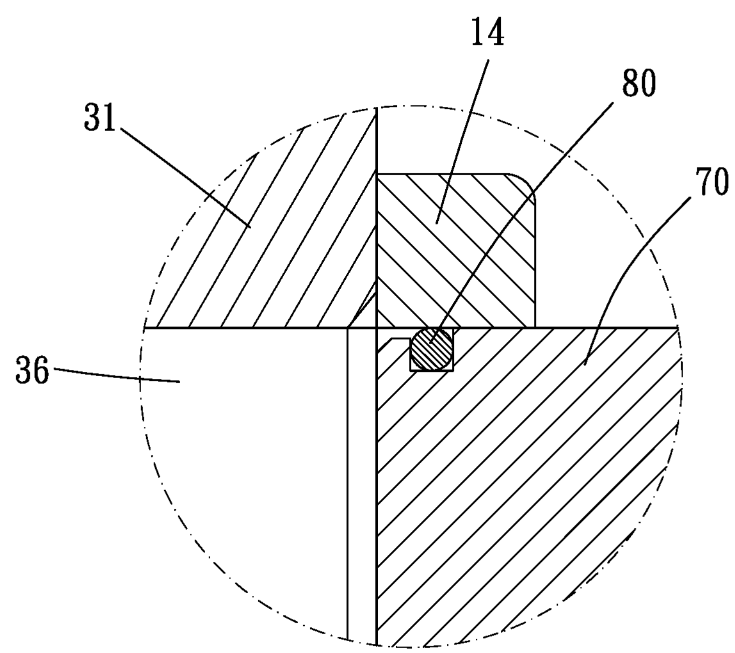
FIG. 11 is a partially-enlarged view of FIG. 10.

Furthermore, the detachment puller 1 has a plurality of pins 70, each of the plurality of pivoting portions 12 has a first pivotal hole 13, each of the plurality of jaws 30 has a second pivotal hole 36 which corresponds to one of the first pivotal hole 13, each of the plurality of pins 70 is detachably disposed through one of the first pivotal hole 13 and one of the second pivotal hole 36, an exterior circumference of each of the plurality of pins 70 includes a ring member 80 which is radially deformable and blockable by a hole flange of one of the first pivotal hole 13. In this embodiment, the ring member 80 is a C-ring, the exterior circumference of the pin 70 further has an annular groove for the C-ring to engaged therewith, and through a gap between the C-ring and the annular groove, the C-ring receives a force and is pressed radially; in other embodiments, the ring member may be, for example, a rubber elastic body. Specifically, each of the plurality of pivoting portions 12 includes two ear portions 14, the two ear portions 14 define the recess 17, each of the two ear portions 14 has the first pivotal hole 13, two opposite sides of one of the two ear portions 14 have two first guide slant annular end faces 15, 16 corresponding to the first pivotal hole 13 so that two first guide slant annular end faces 15, 16 can press the ring member 80 to deform radially to be smoothly guided through the first pivotal hole 13 and reposition radially and abut against the ear portion 14; two opposite sides of one of the plurality of jaws 30 have two second guide slant annular end faces 37, 38 corresponding to the second pivotal hole 36 so that two second guide slant annular end faces 37, 38 can press the ring member 80 to deform radially to be smoothly guided through the second pivotal hole 36 and reposition radially and abut against the ear portion 14; therefore, the pin 70 can be easily disassembled to quickly assemble or disassemble each of the plurality of jaws 30, and the ring member 80 can abut against a side of the ear portion 14 to prevent detachment (as shown in FIGS. 10 and 11).

The detachment puller 1 further includes a cylinder holder 18, the main body 10 further includes a through hole 19, the cylinder holder 18 is detachably disposed within the through hole 19, and the cylinder holder 18 includes the threaded hole 19. In this embodiment, an interior thread of the through hole 10 define a threaded hole 11', and the user can switch between dimensions of the threaded holes 11, 11' through disassembling or assembling the cylinder holder 18 to the through hole 19 in accordance with different dimensions of toothed shaft 4 or the screw rod 20 (a hydraulic screw rod).

The detachment puller 1 further includes a plurality of elastic fixation mechanisms 90, the cylinder holder 18 includes a plurality of positioning portions 181, each of the plurality of positioning portions 181 includes a plurality of first abutting faces 182, the threaded hole 11 has a plurality of second abutting faces 183 which correspond to the plurality of first abutting faces 182, and each of the plurality of elastic fixation mechanisms 90 abuts against and between one of the plurality of first abutting faces 182 and one of the plurality of second abutting faces 183. Specifically, each of the plurality of elastic fixation mechanisms 90 includes an elastic member 91 which is engaged within one of the first and second abutting faces 182, 183 and a fixing member 92 which is engaged within one of the first and second abutting faces 182, 183. In this embodiment, the first abutting face 182 has a receiving groove 184 which receives the elastic fixation mechanism 90, each of the plurality of second abutting faces 183 has a recess 185, and the fixing member 92 partly protrudes beyond the receiving groove 184 and engaged within the recess 185; thereby, each of the plurality of elastic fixation mechanisms 90 can be elastically pressed and recover so that the cylinder holder 18 can be directly assembled within or detached from the through hole 19 quickly.

In actual practice, the plurality of jaws 30 are arranged around the main body 10, and the plurality of jaws 30 can swing and adjust the angle relative to the main body 10 according to a diameter of an object 2 to be clamped so as to clamp the object 2 to be clamped. The adjustment mechanism 40 is movable relative to the main body 10, the first abutting portion 42 or the second abutting portion 43 abuts against the abutted portion 31 toward a direction opposite to a moving direction of the adjustment mechanism 40, and each of the plurality of jaws 30 can radially open or close (for example, in this embodiment, when the detachment puller 1 is pressed down, each of the plurality of jaws 30 opens, and when the detachment puller 1 is pulled up to reposition, each of the plurality of jaws 30 closes, but may not limited thereto).

Given the above, in the detachment puller presses, each of the plurality of abutting portions, including a first abutting portion and a second abutting portion, abuts respectively toward a first and second direction against the abutted portion so that each of the plurality of jaws can smoothly and stably swing and reposition.

While we have shown and described various embodiments in accordance with the present invention, it should be clear to those skilled in the art that further embodiments may be made without departing from the scope of the present invention.

What is claimed is:

1. A detachment puller, including:

a main body, having a threaded hole and a plurality of pivoting portions circumferentially disposed around the threaded hole;

a screw rod, screwed with the threaded hole;

a plurality of jaws, respectively pivoted to the plurality of pivoting portions, each of the plurality of jaws including an abutted portion and a second abutted portion, the abutted portion and the second abutted portion being diametrically opposite to each other relative to a pivot point of the jaw;

an adjustment mechanism, elastically and movably disposed on the main body, the adjustment mechanism including a plurality of engaging portions, each of the plurality of engaging portions including a first abutting portion and a second abutting portion, either of the abutted portion and the second abutted portion being optional to be located between the first and second abutting portions; wherein when the abutted portion is located between the first and second abutting portions, the first abutting portion is movable toward a first direction to press the abutted portion, the second abutting portion is movable toward a second direction to press the abutted portion, and the first and second directions being opposite to each other;

wherein when the second abutted portion is located between the first and second abutting portions, the first abutting portion is movable toward the first direction to press the second abutted portion, and the second abutting portion is movable toward the second direction to press the second abutted portion;

wherein each of the plurality of engaging portions further includes an engaging groove disposed between the first and second abutting portions, the abutted portion is engaged within the engaging groove, and when being on a first position, each of the plurality of jaws abuts only against the engaging groove without abutting against the first and second abutting portions.

2. The detachment puller of claim 1, wherein the abutted portion further includes a first abutted slant face and a second abutted slant face, the first and second abutted slant faces are located on two opposite sides of the abutted portion, the first abutting portion is abuttable against the first abutted slant face, and the second abutting portion is abuttable against the second abutted slant face.

3. The detachment puller of claim 2, wherein the abutted portion further includes a convex face which is located between the first and second abutted slant faces, when each of the plurality of jaws is on the first position, only the convex face abuts against the engaging groove, and when each of the plurality of jaws is on a second position, one of the first and second abutting portions abuts against the convex face and each of the plurality of jaws swings between the first and second positions.

4. The detachment puller of claim 1, wherein the adjustment mechanism further includes a base, the plurality of engaging portions are disposed on the base, and each of the plurality of engaging portions protrudes laterally outward from the base.

5. The detachment puller of claim 4, wherein each of plurality of engaging portions is detachably disposed on the base.

6. The detachment puller of claim 1, further including a tube and a positioning ring, the tube being connected to the main body, the tube and the threaded hole being coaxially arranged, the adjustment mechanism including a base, the base being sleeved to the tube via a through hole of the base, the positioning ring being movably and positionably sleeved to the tube, the base being located between the main body and the positioning ring, the positioning ring being abuttable against the base.

7. The detachment puller of claim 1, further including a plurality of pins, wherein each of the plurality of pivoting portion has a first pivotal hole, each of the plurality of jaws has a second pivotal hole which corresponds to one of the first pivotal hole, each of the plurality of pins is detachably disposed through one of the first pivotal hole and one of the second pivotal hole, an exterior circumference of each of the plurality of pins includes a ring member which is radially deformable and blockable by a hole flange of one of the first pivotal hole.

8. The detachment puller of claim 1, further including a cylinder holder, the main body further including a through hole, the cylinder holder being detachably disposed within the through hole, the cylinder holder including the threaded hole.

9. The detachment puller of claim 2, wherein the abutted portion is cone-shaped; the engaging groove is a chamfered groove; each of the plurality of engaging portions protrudes toward the first direction, each of the plurality of pivoting portions has a recess, the plurality of jaws are pivoted to the recess, each of the plurality of engaging portions is inserted into the recess, and a side of each of the plurality of engaging portions abuts against a bottom of the recess; the adjustment mechanism further includes a base, the plurality of engaging portions are disposed on the base, and each of the plurality of engaging portions protrudes laterally outward from the base; each of plurality of engaging portions is detachably disposed on the base; the detachment puller further includes a tube and a positioning ring, the tube is connected to the main body, the tube and the threaded hole are coaxially arranged, the base is sleeved to the tube via a through hole of the base, the positioning ring is movably and positionably sleeved to the tube, the base is located between the main body and the positioning ring, and the positioning ring is abuttable against the base; the positioning ring is screwable relative to the tube; the detachment puller has a plurality of pins, each of the plurality of pivoting portion has a first pivotal hole, each of the plurality of jaws has a second pivotal hole which corresponds to one of the first pivotal hole, each of the plurality of pins is detachably disposed through one of the first pivotal hole and one of the second pivotal hole, an exterior circumference of each of the plurality of pins includes a ring member which is radially deformable and blockable by a hole flange of one of the first pivotal hole; each of the plurality of pivoting portions includes two ear portions, the two ear portions define the recess, each of the two ear portions has the first pivotal hole, two opposite sides of one of the two ear portions have two first guide slant annular end faces corresponding to the first pivotal hole, and two opposite sides of one of the plurality of jaws have two second guide slant annular end faces corresponding to the second pivotal hole; each of the plurality of abutted portions protrudes radially beyond a side wall of each of the plurality of jaws; the detachment puller further includes a cylinder holder, the main body further includes a through hole, the cylinder holder is detachably disposed within the through hole, and the cylinder holder includes the threaded hole; the detachment puller further includes a plurality of elastic fixation mechanisms, the cylinder holder includes a plurality of positioning portions, each of the plurality of positioning portions includes a plurality of first abutting faces, the threaded hole has a plurality of second abutting faces which correspond to the plurality of first abutting faces, and each of the plurality of elastic fixation mechanisms abuts against and between one of the plurality of first abutting faces and one of the plurality of second abutting faces.

* * * * *